United States Patent
Ye

(10) Patent No.: US 6,695,449 B2
(45) Date of Patent: Feb. 24, 2004

(54) LENS DESIGN TO ENHANCE VISION QUALITY

(75) Inventor: Ming Ye, Fort Worth, TX (US)

(73) Assignee: Novartis AG, Basel (CH)

( * ) Notice: Subject to any disclaimer, the term of this patent is extended or adjusted under 35 U.S.C. 154(b) by 99 days.

(21) Appl. No.: 09/911,332

(22) Filed: Jul. 23, 2001

(65) Prior Publication Data

US 2002/0044255 A1 Apr. 18, 2002

Related U.S. Application Data

(63) Continuation of application No. 60/225,954, filed on Aug. 17, 2000.

(51) Int. Cl.[7] ............................................... G02C 7/04
(52) U.S. Cl. ............................. 351/160 R; 351/160 H
(58) Field of Search ........................... 351/161, 160 R, 351/160 H, 162, 164, 168–169; 623/6.24, 6.27–6.29

(56) References Cited

U.S. PATENT DOCUMENTS

| | | | |
|---|---|---|---|
| 5,125,729 A | 6/1992 | Mercure | 351/161 |
| 5,139,325 A | 8/1992 | Oksman et al. | 351/161 |
| 5,181,053 A | 1/1993 | Brown | 351/161 |
| 5,619,289 A | 4/1997 | Seider et al. | 351/161 |
| 5,771,088 A | 6/1998 | Perrott | 351/161 |
| 5,815,239 A | 9/1998 | Chapman et al. | 351/177 |
| 5,864,379 A * | 1/1999 | Dunn | 351/161 |
| 5,929,969 A * | 7/1999 | Roffman | 351/161 |
| 6,244,708 B1 | 6/2001 | Chapman et al. | 351/160 R |
| 6,305,801 B1 * | 10/2001 | Kerns, Jr. et al. | 351/162 |

FOREIGN PATENT DOCUMENTS

| | | |
|---|---|---|
| EP | 0 942 312 A2 | 9/1999 |
| WO | WO 00/08516 | 2/2000 |

OTHER PUBLICATIONS

International Search Report application No. PCT/EP/09463 filed Aug. 17, 2001.

* cited by examiner

Primary Examiner—Jordan M. Schwartz
(74) Attorney, Agent, or Firm—Jian S. Zhou; R. Scott Meece; Robert J. Gorman

(57) ABSTRACT

A contact lens includes a central zone and a peripheral zone. The central zone extends radially from a center to a central intermediate edge and has a radius corresponding to a radius of a contracted pupil of a user when subjected to a high ambient light condition. The central zone also has a constant first refractive power across the central zone. The peripheral zone extends radially from the central intermediate edge to an outer edge and has a radius corresponding to a dilated pupil of the user. The peripheral zone has a refractive power that is equal to the first refractive power at the intermediate edge and that increases radially to a second refractive power, different from the first refractive power, at the outer edge. The contact lens also includes a non-optical zone that extends radially from the outer edge to an outermost radius corresponding to a radius of a user's cornea.

12 Claims, 4 Drawing Sheets

LENS DESIGN TO ENHANCE VISION QUALITY

BACKGROUND OF THE INVENTION

This application claims the benefit under 35 U.S.C. §119 (e) of the U.S. provisional application No. 60/225,954 filed on Aug. 17, 2000.

1. Field of the Invention

The present invention relates to optics and, more specifically, to optical lenses.

2. Description of the Prior Art

The human eye 100, as shown in FIG. 1A, includes a cornea 102, an iris 104 that forms an aperture known as the pupil 106a and a retina 108 onto which light rays are focused. When the eye 100 is subjected to low ambient light conditions, the iris 104 dilates, resulting in a pupil 106a having a large aperture. If there is no spherical aberration in the cornea 102, then parallel light rays entering the eye 100 will be focused on a single point of the retina 108. If, on the other hand, the cornea 102 exhibits spherical aberration, as shown in FIG. 1B, the light rays will be focused over an area of the retina 108.

As shown in FIG. 1C, when an eye 100 without corneal spherical aberration views an object 110, light from each point (e.g., points A, B) along the object 110 are focused along corresponding points (e.g., points A', B') on the retina 108, resulting in a clear image. This situation changes when the eye 100 has a spherical aberration, as shown in FIG. 1D. Light from each single point (e.g., point A) on the object 110 is directed to several points (e.g., points A', A", A'"), causing the object 110 to appear blurred.

This situation changes when an eye 100 is subjected to high ambient light conditions, as demonstrated in FIG. 1E. The iris 104 contracts, which results in the pupil 106e having a small aperture. Because light rays from an object 110 passing through the cornea 102 are constrained by the contracted pupil 106a, they tend to be highly focused on the retina 108. Thus, the object 110 appears in focus.

Therefore, there is a need for a lens that provides additional correction to a user when the user's eye is subjected to low ambient light conditions, but that provides relatively less correction when the user's eye is subjected to high ambient light conditions.

SUMMARY OF THE INVENTION

The disadvantages of the prior art are overcome by the present invention which, in one aspect, is a contact lens that includes a central zone and a peripheral zone. The central zone extends radially from a center to a central intermediate edge and has a radius corresponding to a radius of a contracted pupil of a user when subjected to a high ambient light condition. The central zone also has a constant first refractive power across the central zone. The peripheral zone extends radially from the central intermediate edge to an outer edge. The peripheral zone has a refractive power that is equal to the first refractive power at the intermediate edge and that changes radially and progressively toward a second refractive power, different from the first refractive power, at the outer edge.

In another aspect, the contact lens also includes a non-optical zone that extends radially from the outer edge to an outermost radius corresponding to a radius of a user's cornea.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
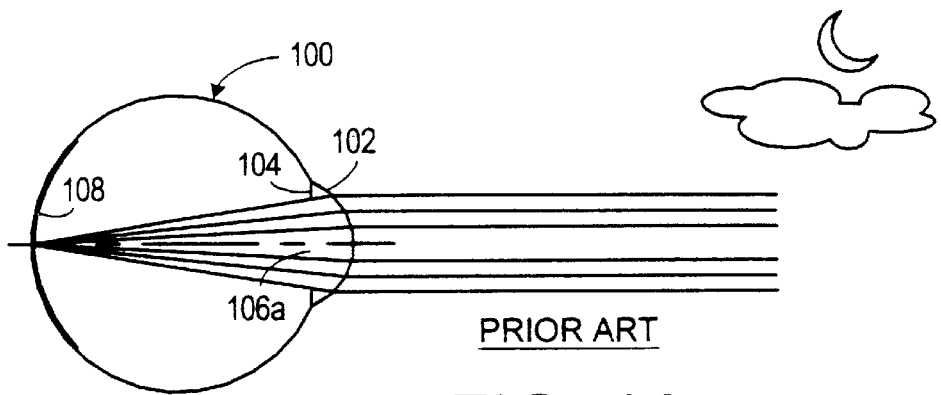
FIG. 1A is a prior art illustration of an eye with no spherical aberration focusing on parallel rays in low ambient light conditions.
Figure 1B:
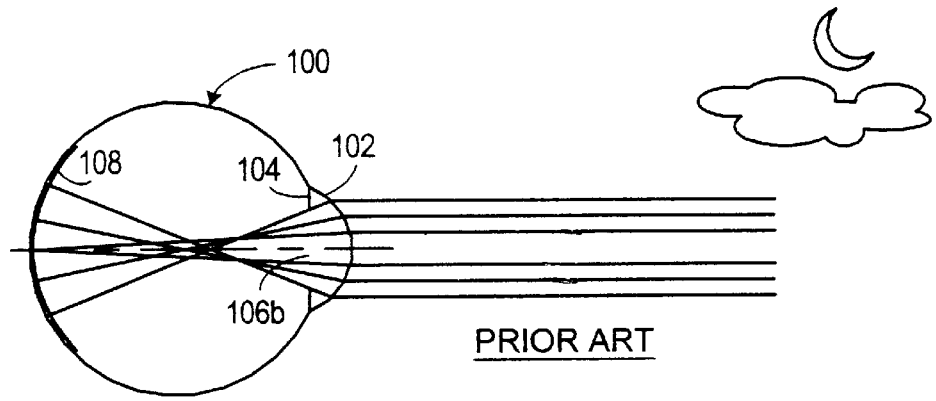
FIG. 1B is a prior art illustration of an eye with spherical aberration focusing on parallel rays in low ambient light conditions.
Figure 1C:
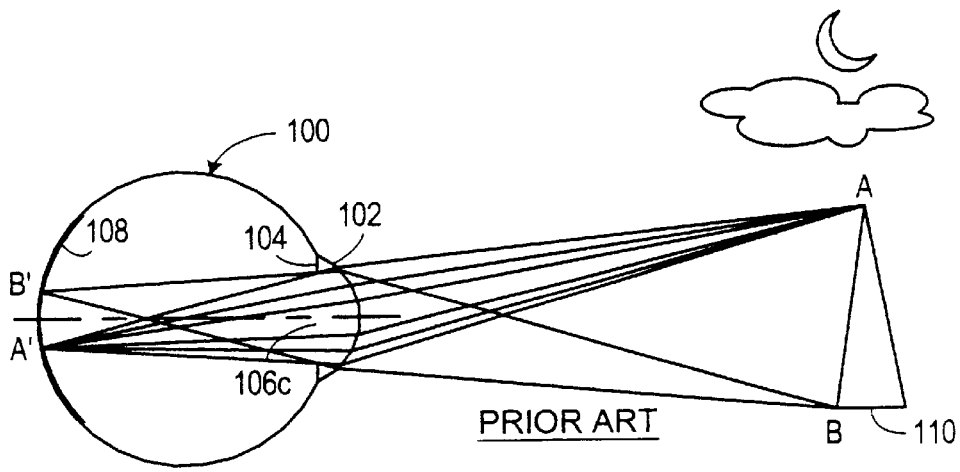
FIG. 1C is a prior art illustration of an eye with no spherical aberration focusing on an object in low ambient light conditions.
Figure 1D:
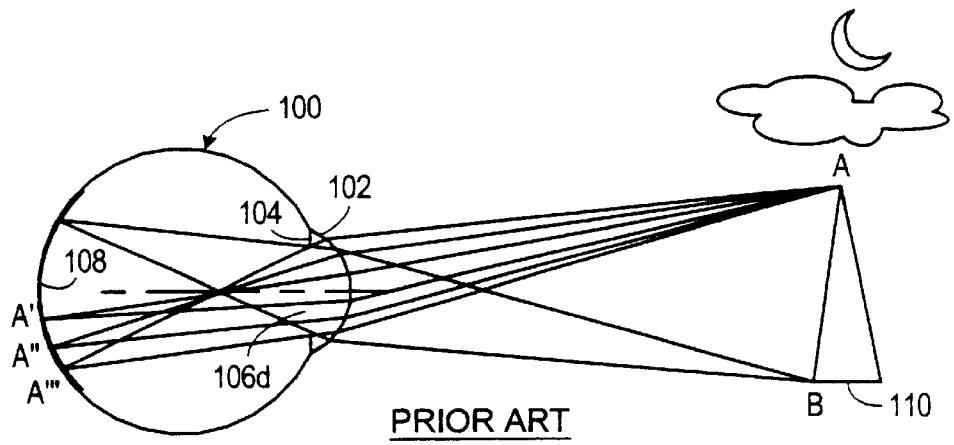
FIG. 1D is a prior art illustration of an eye with spherical aberration focusing on an object in low ambient light conditions.
Figure 1E:
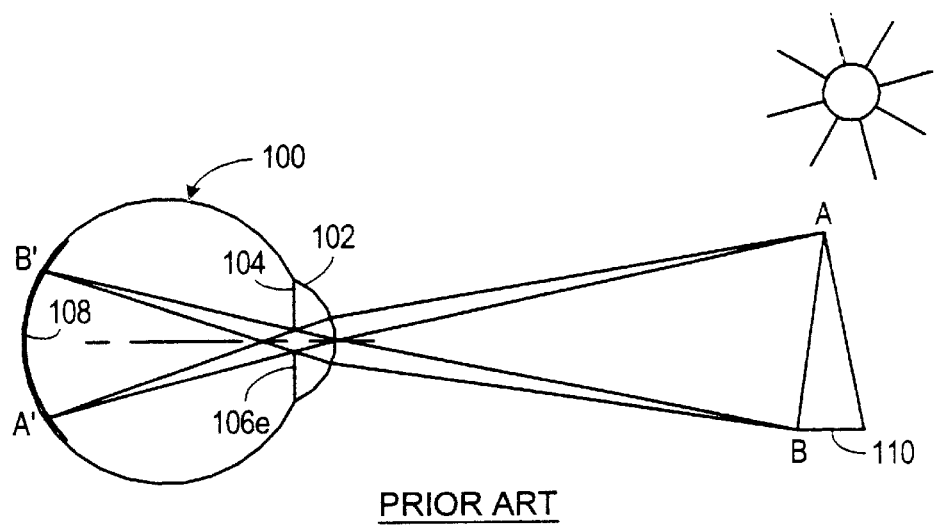
FIG. 1E is a prior art illustration of an eye focusing on an object in high ambient light conditions.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 2A:
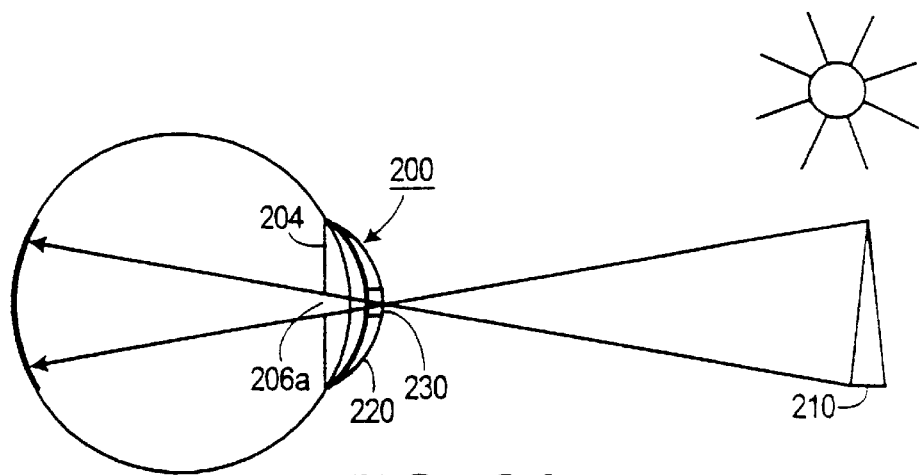
FIG. 2A is an illustration of the invention employed on an eye focusing on an object in high ambient light conditions.

As shown in FIG. 2A, one embodiment of the invention is a contact lens 200 that includes a central zone 230 and a peripheral zone 220. The central zone 230 has a radius corresponding to a radius of a contracted pupil 206a of a user when subjected to a high ambient light condition. Because the iris 204 contracts the pupil 206a in high ambient light conditions, rays of light from an object 210 passing through the central zone 230 tend to be constrained by the contracted pupil 206a and, thus, focused with little additional correction. Therefore, the central zone 230 has only a nominal refractive power, which is equal either to zero diopters or to the normal distance correction for the eye to which the lens 200 is to be applied.

Figure 2B:
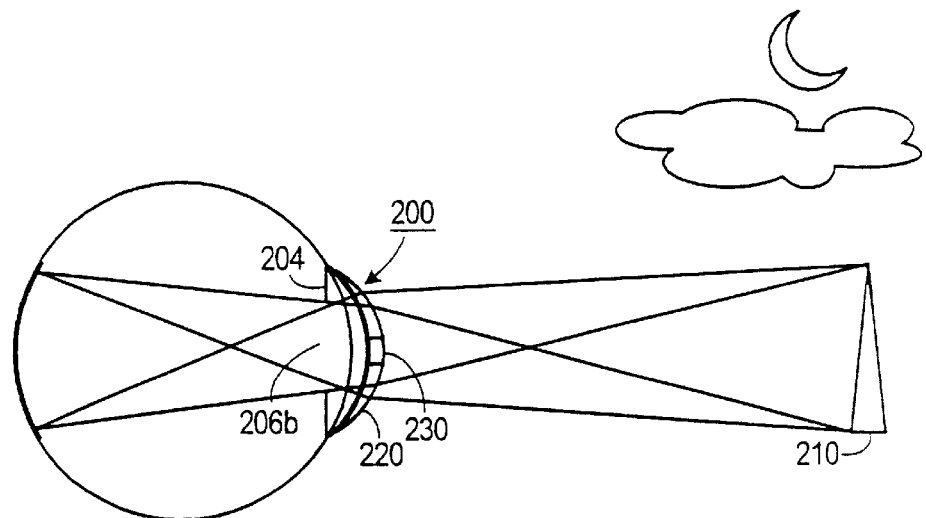
FIG. 2B is an illustration of the invention employed on eye focusing on an object in low ambient light conditions.

The peripheral zone 220, on the other hand, as shown in FIG. 2B, has a radius large enough to cover a dilated pupil 206b of the user as the eye is subjected to low ambient light conditions. Because the rays of light from the object 210 are not constrained as much when the pupil 206b is dilated, the eye normally experiences strain while focusing on an object 210 in low light conditions. Therefore, the peripheral zone 220 includes a gradually increasing refractive power as the peripheral zone 220 extends away from the central zone 230. Thus, as the pupil 206b increasingly dilates, an increased amount of correction is applied to the rays of light from the object 210, thereby bringing the object into focus and reducing strain on the eye.

Figure 3:
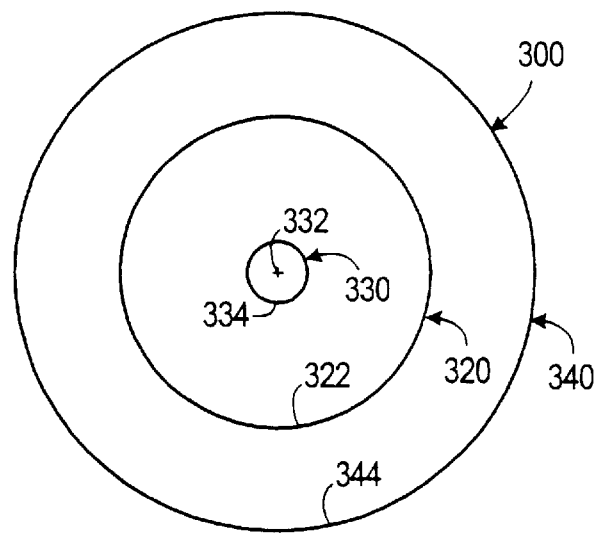
FIG. 3 is a plan view of one embodiment of the invention.

As shown in FIG. 3, the central zone 330 extends radially from a center 332 to a central intermediate edge 334. The peripheral zone 320 extends from the central intermediate edge 334 to an outer edge 322. Typically, contact lenses according to the invention will also include a non-optical zone 340 that extends radially from the outer edge 322 to an outermost radius 344. The non-optical zone 340 is added to provide corneal coverage. The radius of the non-optical zone is typically chosen to correspond to the radius of the cornea of the user of the lens.

Figure 4:
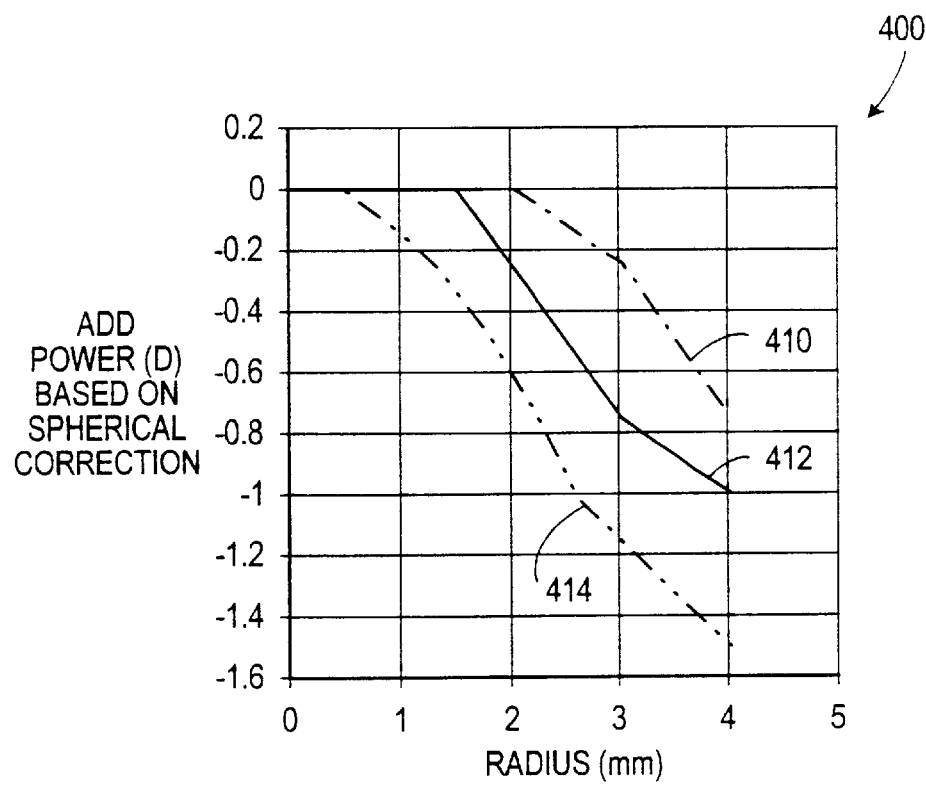
FIG. 4 is a graph of add power on a contact lens as radius increases according to the invention.

A graph 400 of the refractive power added to the lens as a function of the radius of any given point along the surface of the lens from the center is shown in FIG. 4. In an embodiment that assumes the contracted pupil to have a radius of approximately 2 mm, curve 410 shows no added corrective power (a refractive power of zero diopters) in the central zone, with an added corrective power up to approximately minus 0.7 diopters as the peripheral zone extends to 4 mm. Curves 412 and 414 show other configurations and their respective additional corrective power distributions. Curve 412 corresponds to the power profile having the averaged correction required by most of the population. Curve 410 would apply to those eyes with very little spherical aberration, while curve 414 would be used with those eyes with greater than average spherical aberration.

A lens according to the invention could reduce eye strain for an eye that has no inherent spherical aberration. In such a lens, constructed according to curve 414, the central zone would have a constant corrective power of zero diopters and the peripheral zone would have an increasing corrective power from zero diopters adjacent the central zone up to −1.2 diopters at the outer edge.

When the eye has a spherical aberration, the central zone of a lens constructed according to curve 414 would have a corrective power equal to the normal distance vision corrective power necessary to correct the spherical aberration. The peripheral zone would have a corrective power that increases from the normal distance vision corrective power, adjacent the central zone, to the normal distance vision corrective power plus approximately −1.2 diopters at the outer edge.

Similarly, the invention could be applied to lenses used to correct astigmatism and other optical conditions. Furthermore, use of the invention is not limited to contact lenses, but may be employed with other types of lenses, such as interocular lenses, artificial corneas, etc.

As will be readily appreciated by those of skill in the art of lens manufacturing, a lens according to the invention could be produced using almost any one of the many techniques of multi-focal lens manufacturing. For example, a contact lens according to the invention could be manufactured using a conventional contact lens lathe to make a master cast. Any of the conventional materials used to produce lenses could be employed in a lens according to the invention.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What is claimed is:

1. A contact lens, comprising:
   a. a central zone extending radially from a center to a central intermediate edge, the central zone having a radius corresponding to a radius of a contracted pupil of a user when subjected to a high ambient light condition, the central zone having a constant first refractive power across the central zone; and
   b. a peripheral zone extending radially from the central intermediate edge to an outer edge and having a radius corresponding to a radius of a dilated pupil of the user, the peripheral zone having a refractive power that is equal to the first refractive power at the intermediate edge and that changes radially and progressively toward a second refractive power, different from the first refractive power, at the outer edge.

2. The contact lens of claim 1, wherein the first refractive power is zero diopters.

3. The contact lens of claim 1, wherein the first refractive power is a refractive power sufficient to correct a spherical aberration of a user's eye.

4. The contact lens of claim 1, further comprising a non-optical zone extending radially from the outer edge to an outermost radius.

5. The contact lens of claim 4, wherein the outermost radius corresponds at least to a radius of a user's cornea.

6. The contact lens of claim 1, wherein the radius of the central zone is not greater than 3 mm.

7. The contact lens of claim 6, wherein the radius of the central zone is from 1 mm to 2 mm.

8. The contact lens of claim 1, wherein the peripheral zone has a radius between 0.5 mm and 6 mm.

9. The contact lens of claim 1, wherein the second correction power is between the first correction power minus 0.6 diopters and the first correction power minus 1.3 diopters.

10. A lens, comprising:
    a. a central zone extending radially from a center to a central intermediate edge, the central zone having a radius corresponding to a radius of a contracted pupil of a user when subjected to a high ambient light condition, the central zone having a constant first refractive power across the central zone;
    b. a peripheral zone extending radially from the central intermediate edge to an outer edge and having a radius corresponding to a radius of a dilated pupil of the user, the peripheral zone having a refractive power that is equal to the first correction power at the intermediate edge and that increases radially to a second refractive power at the outer edge; and
    c. a non-optical zone extending radially from the outer edge to an outermost radius corresponding to a radius of a user's cornea.

11. The lens of claim 10, wherein the second correction power is between the first correction power minus 0.6 diopters and the first correction power minus 1.3 diopters.

12. The lens of claim 10, wherein the lens comprises a contact lens.

* * * * *